(12) United States Patent
Ennis

(10) Patent No.: US 8,783,271 B2
(45) Date of Patent: Jul. 22, 2014

(54) WATERFALL TANK SYSTEM

(76) Inventor: G. Thomas Ennis, Inglewood, CA (US)

( * ) Notice: Subject to any disclaimer, the term of this patent is extended or adjusted under 35 U.S.C. 154(b) by 430 days.

(21) Appl. No.: 12/655,328

(22) Filed: Dec. 29, 2009

(65) Prior Publication Data
US 2011/0155175 A1 Jun. 30, 2011

(51) Int. Cl.
B08B 3/04 (2006.01)

(52) U.S. Cl.
USPC ............................. 134/45; 134/123

(58) Field of Classification Search
USPC .................................... 134/45, 123
See application file for complete search history.

(56) References Cited

U.S. PATENT DOCUMENTS

| | | | |
|---|---|---|---|
| 3,035,293 A | 5/1962 | Larson | |
| 3,339,563 A * | 9/1967 | Ordonez | 134/57 R |
| 4,035,862 A | 7/1977 | Ennis | |
| 4,441,226 A | 4/1984 | Hanna | |
| 4,777,688 A | 10/1988 | Seamster | |
| 5,076,202 A | 12/1991 | Falls | |
| 5,076,304 A | 12/1991 | Mathews | |
| 5,432,974 A * | 7/1995 | Yasutake et al. | 15/316.1 |
| 5,709,002 A | 1/1998 | Belanger | |
| 5,813,077 A | 9/1998 | Belanger | |
| 5,853,494 A * | 12/1998 | Andersson | 134/10 |
| 7,494,547 B2 * | 2/2009 | Peterson et al. | 118/315 |
| 7,681,274 B2 | 3/2010 | Belanger | |
| 2006/0011223 A1 * | 1/2006 | Peterson et al. | 134/123 |
| 2008/0040882 A1 * | 2/2008 | Duterme | 15/319 |

OTHER PUBLICATIONS

Letter from Quinn Law Group of Alleged Relevance of U.S. Pat. No. 3,035,293 to U.S. Appl. No. 12/655,328, May 13, 2013.

* cited by examiner

Primary Examiner — Michael Barr
Assistant Examiner — Benjamin L Osterhout
(74) Attorney, Agent, or Firm — Risso & Associates

(57) ABSTRACT

A waterfall tank system is described for sheeting water onto a passing vehicle. The waterfall tank system includes a tank with a water supply inlet and a soap injector for injecting soap into the water flow to create a soap mix that is supplied to the tank. An air motor is included for providing air to an air manifold that is disposed within the tank. When air is introduced into the soap mix, bubbles are created. As the water, soap mix, and bubbles fill the tank, they fall from the tank via an overflow lip that creates a sheeting action, with the water, soap mix, and/or bubbles sheeting onto a vehicle passing below.

9 Claims, 7 Drawing Sheets

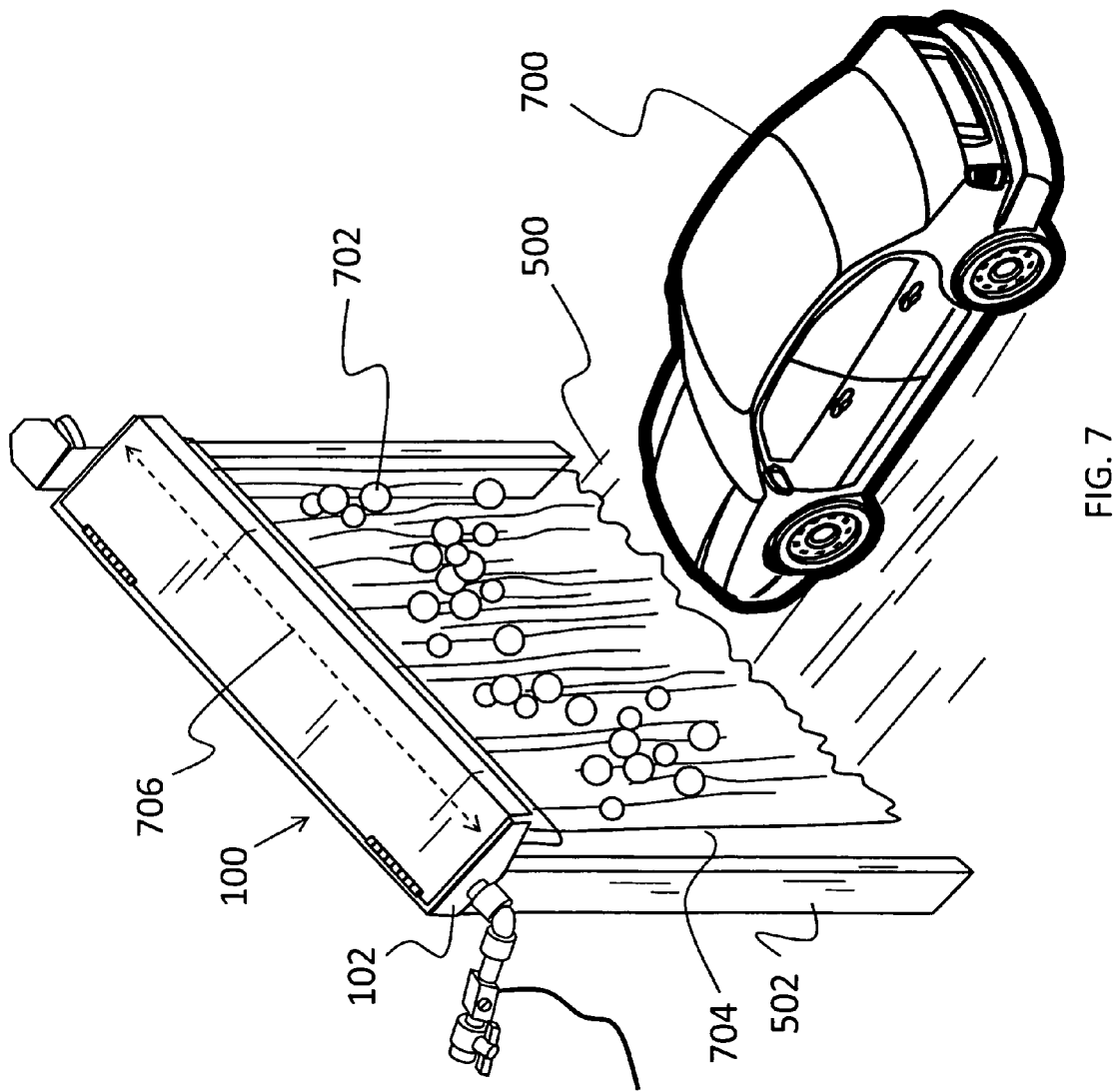

WATERFALL TANK SYSTEM

BACKGROUND OF THE INVENTION (1) Field of Invention

The present invention relates to a waterfall tank and, more particularly, to a waterfall and bubbler tank system for sheeting water and bubbles onto a passing vehicle.

(2) Description of Related Art

Vehicle washing systems have long been known in the art. By way of example, automatic vehicle-washing systems are well-known and are in widespread use for washing passenger automobiles, trucks, buses, railroad equipment, and the like. A typical system includes a conveyor for moving the vehicle through the installation, and a series of power-driven brushes which are moved around the vehicle under a drenching spray of water and soap or detergent to remove dirt and grease. The washed vehicle is given a spray of clean rinse water, and is then moved to a drying station.

While such drenching spray systems are operable for introducing soap and water to a passing vehicle, they require multiple spray heads, each of which is prone to breakage and maintenance. Additionally, typical spray heads introduce a low volume to the passing vehicle and, therefore, are operated under high pressure to be effective. Further, due to the pumps that are required to operate such spray systems, traditional drenching spray systems utilize a lot of electricity and are otherwise not environmentally sensitive. Finally, spray systems do not evenly distribute the solution as any distribution is largely limited to the location and reach of the spray heads.

Thus, a continuing need exists for an environmentally sensitive system for introducing a relatively large volume of soap and water to a passing vehicle without the need for multiple, high-pressure spray heads.

SUMMARY OF INVENTION

While considering the failure of others to make and/or use all of the above factors/ingredients/steps/components in this technology space, the inventor unexpectedly realized that a waterfall tank system can be employed to introduce a large volume of water, soap, and bubbles to a passing vehicle through a sheeting effect without the need for multiple high-pressure spray heads. Additionally, the use of a sheeting effect provides for an even distribution of water, etc., to the passing vehicle.

Thus, the present invention is a waterfall tank system for sheeting water onto a passing vehicle. The system includes a tank having a trough portion and an overflow lip that is at least as wide as a passing vehicle. A support system is connected with the tank for elevating the tank above a ground surface to allow a vehicle to pass beneath the tank. Additionally, a water supply inlet is fluidly connected with the trough portion of the tank for receiving a water flow from an external water source and introducing water into the tank. Upon receiving water, the trough portion collects the water until the water reaches the overflow lip, at which point the water flows over the overflow lip and sheets from the tank onto a passing vehicle.

To provide soap and bubbles to the system, a soap injector is fluidly connected with the water supply inlet for injecting soap into the water flow to create a soap mix that is supplied to the tank. Additionally, a perforated air manifold is positioned in the trough portion of the tank, with an air motor fluidly connected with the perforated air manifold. An example of such an air manifold is an elongated pipe with a top half and a bottom half, with two rows of holes formed along the top half while a single row of holes are formed along the bottom half. The air motor is used to introduce air through the perforated air manifold and into the soap mix. Thus, upon receiving the soap mix and air, bubbles are created that fill the tank until reaching the overflow lip, at which point the bubbles and soap mix (and water) flow over the overflow lip and onto the passing vehicle.

To control the volume of the water, soap, bubbles, and/or soap mix within the tank, a mechanical float valve is operably connected with the water supply inlet to close upon the volume exceeding a predetermined level within the tank and to open upon the volume falling below the predetermined level.

In some circumstances, it may be desirable to direct the flow of the water. In this aspect, a flow director is connected with the overflow lip to direct water flowing over the overflow lip. An example of such a flow director includes a first pivoting arm and a second pivoting arm. Each of the pivoting arms are pivotally connected with the overflow lip such that they can independently reside on the overflow lip to narrow a width of flow of water flowing over the overflow lip or pivot away from the overflow lip to increase the width of flow of water flowing over the overflow lip.

The sheeting effect described above can, in some cases, be disturbed due to air turbulence. To mitigate such disturbance, a curtain is attached with the tank such that it hangs from the tank proximate the overflow lip. The curtain operates to block the air turbulence from affecting the water as it flows from the overflow lip to create the sheeting effect.

Finally, as can be appreciated by one in the art, the present invention also comprises a method for forming and using the waterfall tank system described herein. The method comprises a plurality of acts of forming and operating the waterfall tank system.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7 is an elevated, perspective-view illustration of the waterfall tank system, depicting the system in operation.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Description

Figure 1:
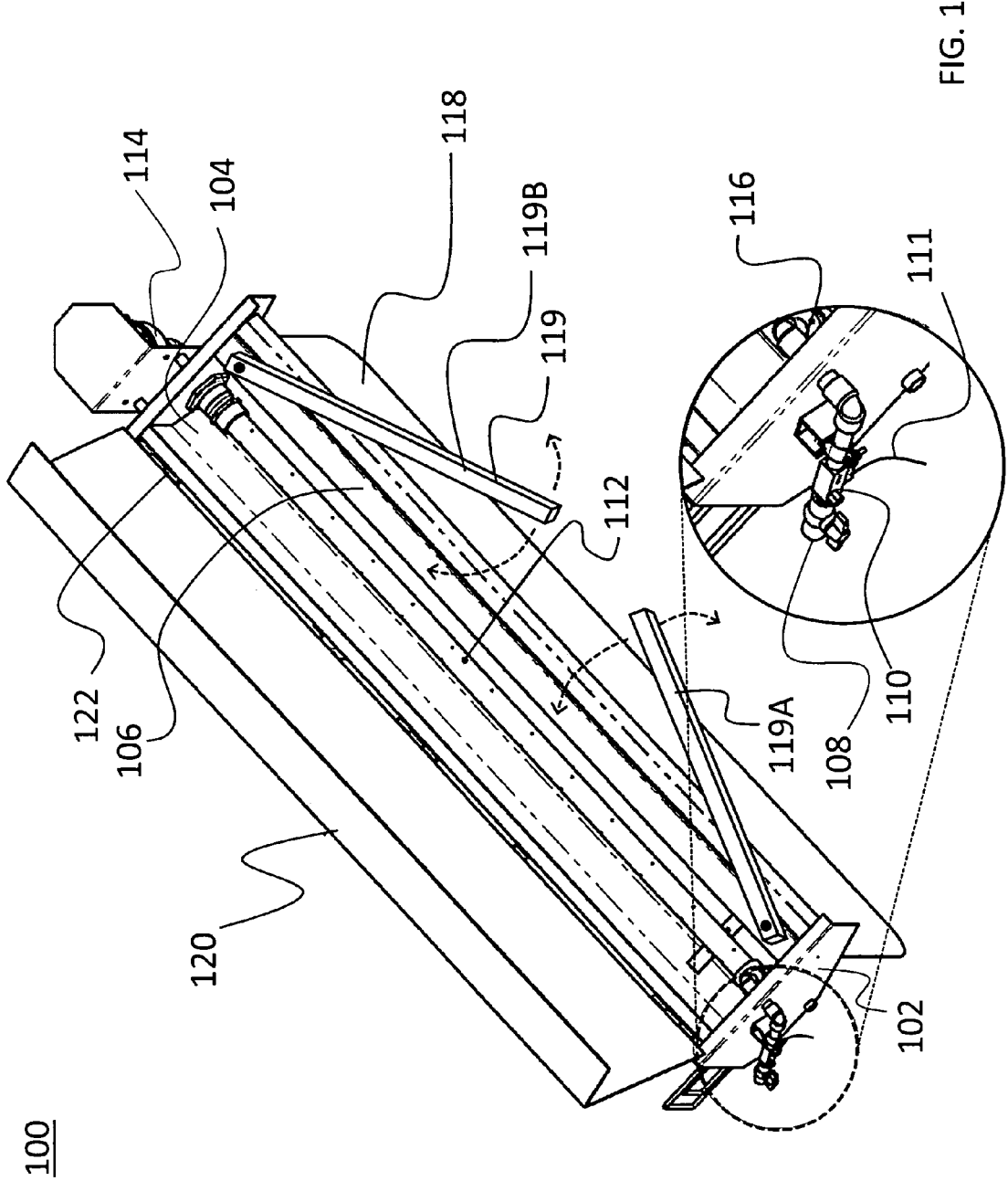
FIG. 1 is an elevated, perspective-view illustration a waterfall tank system according to the present invention.

As shown in FIG. 1, the present invention is a waterfall tank system 100. The present invention provides an improvement over the prior art by using a tank 102 to collect water and a soap mix, which then overflows to provide a gravity-fed waterfall that dumps a relatively large volume of water and bubbles onto a passing vehicle.

In this aspect, the waterfall tank system 100 includes a tank 102 having a trough portion 104 and an overflow lip 106. The trough portion 104 acts as a trough to collect water that is introduced into the tank 102 from a water supply inlet 108. The water supply inlet 108 is fluidly connected (e.g., via piping) with the trough portion 104. In operation, the water supply inlet 108 receives water from an external water source and introduces the water into the tank 102 where it gathers in the trough portion 104. It should be understood that although the system as described uses water, the present invention is not intended to be limited thereto as it can be used with any fluid and/or fluid source. Thus, the water supply inlet 108 is, in its broadest form, a fluid supply inlet, with water being but one non-limiting example.

Upon receiving water, the trough portion 104 collects the water until the water level reaches the overflow lip 106, at which point the water flows over the overflow lip 106 and sheets from the tank 102 onto a passing vehicle (as depicted in FIG. 7). To create a sheeting action, the overflow lip 106 is approximately level across its entire width. Thus, water flowing over the overflow lip 106 will not gather and drain at one side or point and, instead, will fall evenly from the overflow lip 106 to create the sheeting action or effect.

In addition to providing water onto a passing vehicle, the present invention provides soap and bubbles to said vehicle. As depicted in FIG. 1, a soap injector 110 is fluidly connected with the water supply inlet 108 for injecting soap (from a soap line 111) into the water flow to create a soap mix that is supplied to the tank 102. The soap injector 110 is any suitable mechanism or device for injecting/dispensing soap into a water flow, a non-limiting example of which includes an injector/dispenser as produced by Viking LLC, a DEMA Company, located at 512 Industrial Road, Nesquehoning, Pa. 18240, United States of America.

To create bubbles (e.g., soap bubbles), an air manifold 112 is positioned in the trough portion 104 of the tank 102. An air motor 114 is fluidly connected with the air manifold 112 to introduce air through the air manifold 112 and into the soap mix. The air motor 114 is any suitable mechanism or device that is operable for pumping air, a non-limiting example of which includes a 1.5 horse power (HP), 120 Volt Alternating Current (VAC) electric air motor. Upon receiving the soap mix and air, bubbles are created that fill the tank 102 until reaching the overflow lip 106, at which point the bubbles and soap mix flow over the overflow lip 106 and onto a passing vehicle (as depicted in FIG. 7).

Referring again to the air manifold 112, the manifold is any suitable mechanism or device that is operable for receiving air and distributing the air into a fluid (e.g., soap mix), a non-limiting example of which includes a two-inch polyvinyl chloride (PVC) pipe. The air manifold 112 is perforated to allow air that is introduced into the manifold 112 from the air motor 114 to escape into the soap mix. As a non-limiting example, the perforated air manifold 112 is an elongated pipe manifold with a top half and a bottom half, with two rows of holes formed along the top half and a single row of holes formed along the bottom half (e.g., facing downward).

To control the amount of water and soap (and the corresponding soap mix) that is introduced to the tank, a volume control valve 116 is operably connected with the water supply. As a non-limiting example, the volume control valve 116 is a mechanical float valve that is operably connected with water supply inlet to close upon the soap mix exceeding a predetermined level within the tank and to open upon the soap mix falling below the predetermined level.

In operation, as bubbles flow from the overflow lip 106, they fall onto a passing car. However, wind and other air turbulence can sometimes affect the fall of the bubbles. As such, a curtain 118 is attached with the tank 102 to block such air turbulence and prevent the falling bubbles from blowing uncontrollably away from a car surface. For example, the curtain 118 hangs from the tank 102 proximate the overflow lip 106 is formed of any suitably durable and semi-rigid material, a non-limiting example of which includes vinyl. Thus, the curtain 118 allows the bubbles to freely fall, yet blocks wind and other air turbulence.

As noted above, wind and other air turbulence can sometimes affect the fall of the bubbles. Such turbulence can also have an effect on the sheeting of the water that falls from the tank 102. To control the sheeting effect of the water, a flow director 119 can be connected with the overflow lip 106 to direct water that is flowing over the overflow lip 106. The flow director 119 is any suitable mechanism or device that is capable of directing the flow from the overflow lip 106, a non-limiting example of which includes a pair of pivoting arms. For example, a first pivoting arm 119A and a second pivoting arm 119B are pivotally connected with the overflow lip 106 such that they can independently reside on the overflow lip 106 to narrow a width of flow of water flowing over the overflow lip 106. Alternatively, each of the pivoting arms 119A and 119B can pivot away from the overflow lip 106 to increase the width of flow of water (and bubbles, soap mix, etc.) flowing over the overflow lip 106. In other words, the pivoting arms 119A and 119B operate to alter the flow of water by decreasing or increasing the width of the overflow lip 106 (or at least the portion of the overflow lip 106 from which the water can escape and flow)

By narrowing the portion of the overflow lip 106 from which water escapes, the thickness or depth of the water is increased (due the volume of water remaining relatively constant). As such, the sheet of water that now falls from the overflow lip 106 is thicker and less susceptible to air turbulence.

Alternatively, in a situation of low air turbulence, it may be desirable to pivot the pivoting arms 119A and 119B away from the overflow lip 106 to maximize the width of the overflow lip 106 (or the portion of the overflow lip 106 from which water escapes) and, thereby, the width of sheeting water. In this example, the depth of water that flows over the overflow lip 106 is thinner (than the circumstance described above), which creates a thinner, yet wider, sheet of water.

Additionally, a lid 120 is attached with the tank 102 to cover the tank 102 yet allow selective access thereto. For example, the lid 120 is pivotally connected with the tank 102 via hinges 122 or any other suitable connection.

Figures 2A, 2B:
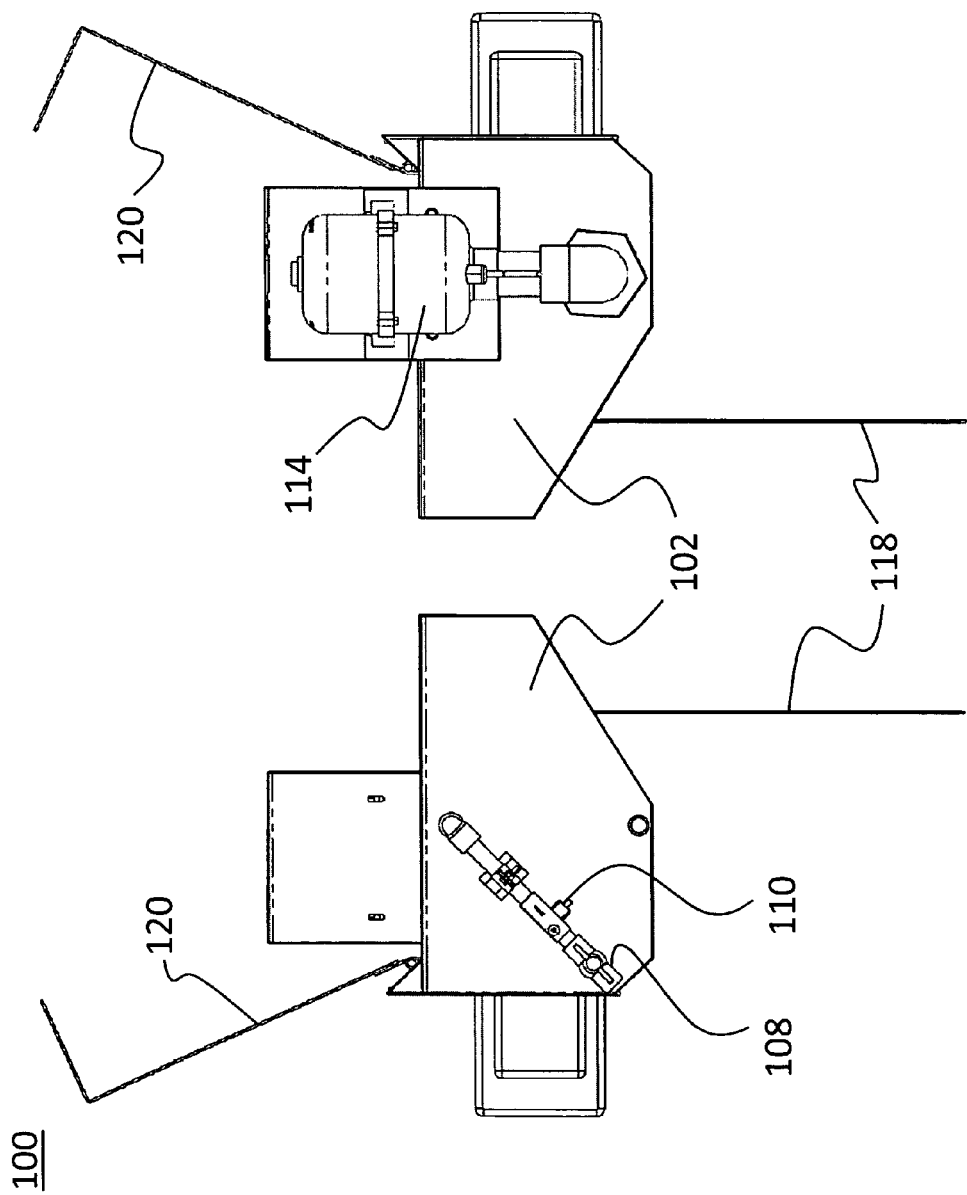
FIG. 2A is a left, side-view illustration of the waterfall tank system.
FIG. 2B is a right, side-view illustration of the waterfall tank system.

For further understanding, FIG. 2A is a left, side-view illustration of the waterfall tank system 100. As shown, the tank 102 includes a hingedly connected lid 120. Also shown are the water supply inlet 108 and the soap injector 110, and the curtain 118 for blocking wind and air turbulence. Alternatively, FIG. 2B is a right, side-view illustration of the tank system 100, depicting the tank 102, lid 120, curtain 118, and air motor 114.

Figure 3:
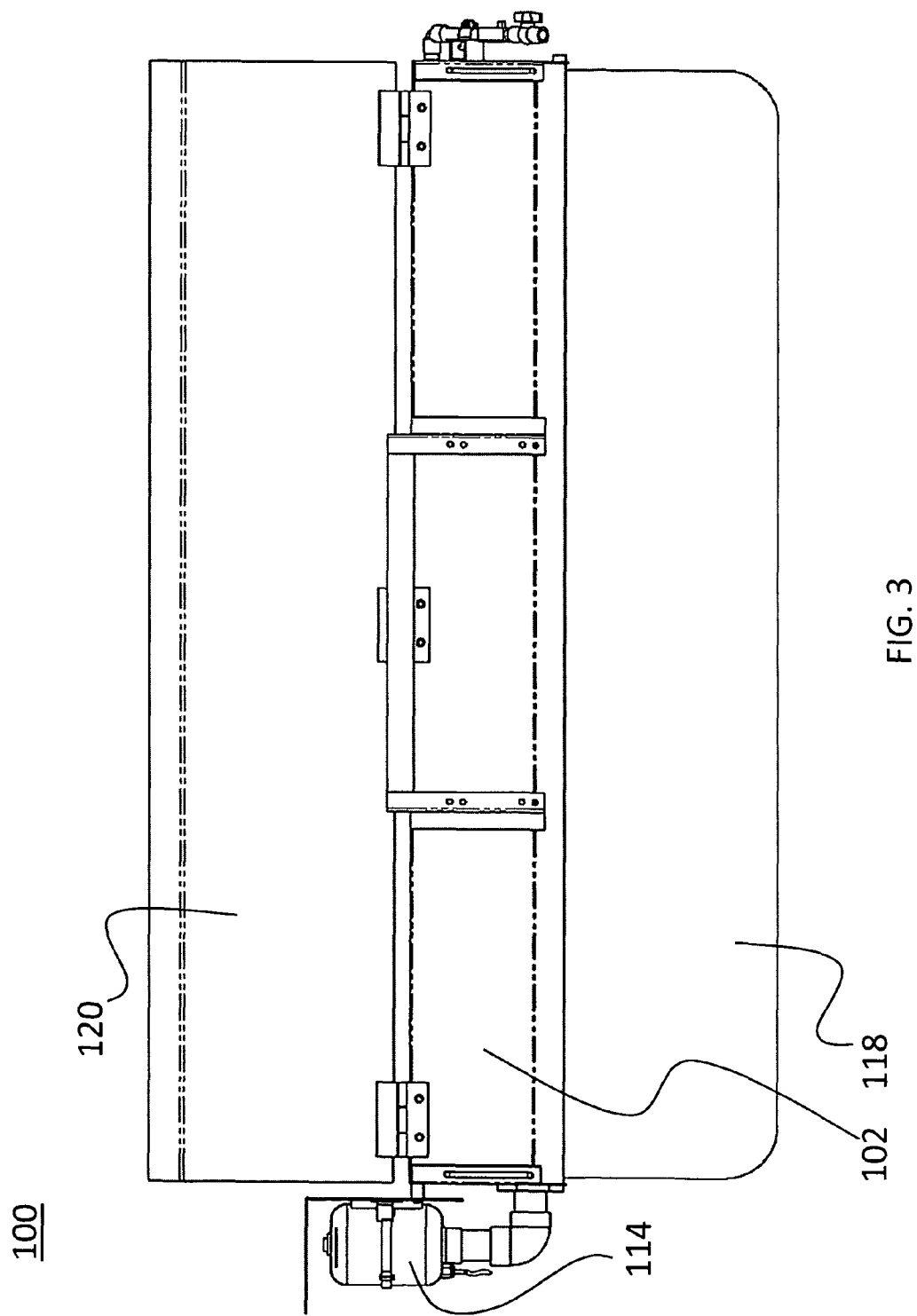
FIG. 3 is a rear-view illustration of the waterfall tank system.

Additionally, FIG. 3 is a rear-view illustration of the waterfall tank system 100, showing the tank 102, curtain 118, air motor 114, and lid 120.

Figure 4:
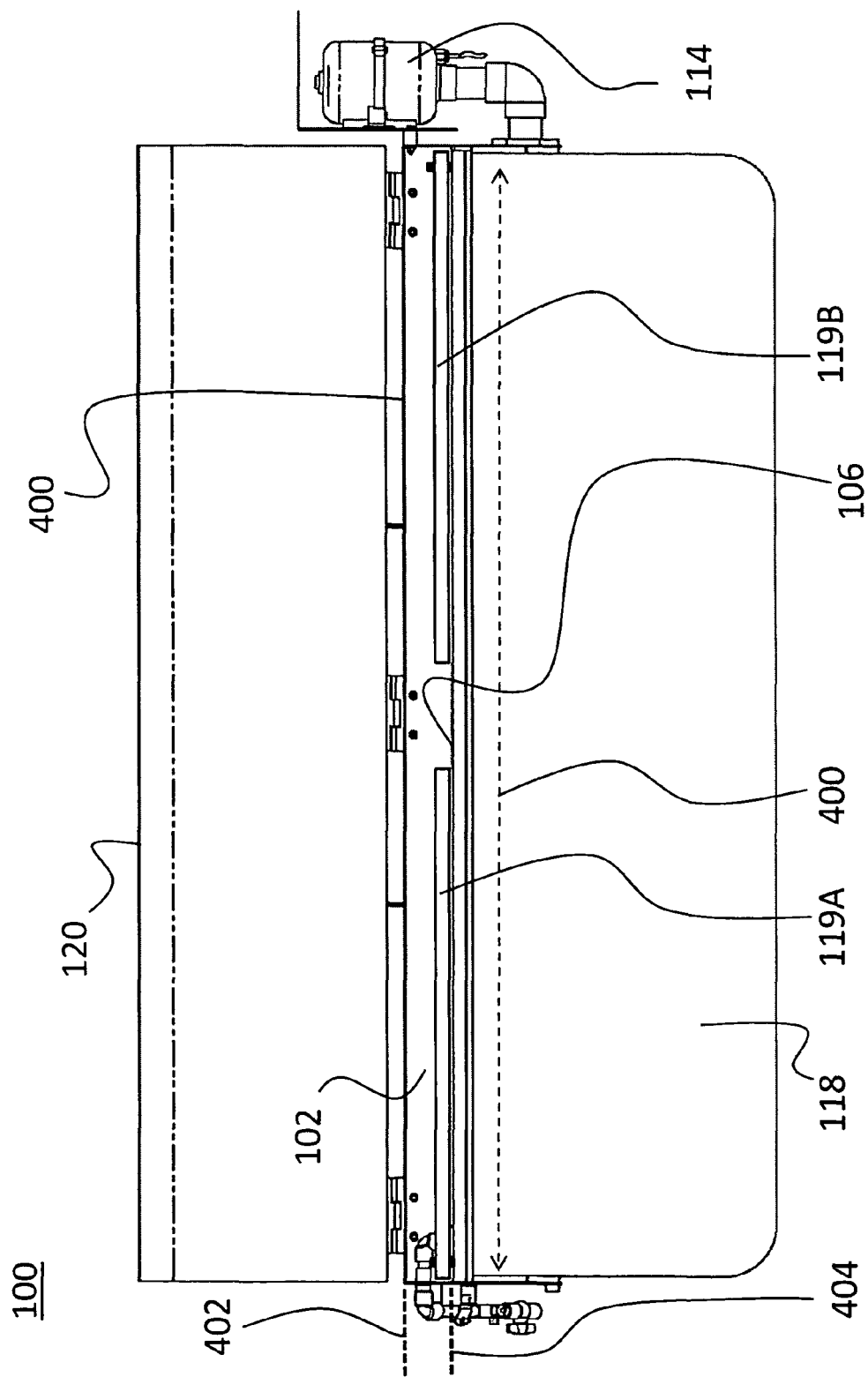
FIG. 4 is a front-view illustration of the waterfall tank system.

FIG. 4 provides yet another view of the waterfall tank system 100, showing a front-view that illustrates the tank 102, curtain 118, lid 120 and air motor 114. Also shown is the overflow lip 106, which is depicted at a level that is below the top 400 of the tank 102. The tank 102 is bound on all sides by walls that rise to a first level 402 (except at the overflow lip 106). The first level 402 is the top 400 of the tank 102, while the overflow lip 106 is at a second level 404 that is below the top 400 of the tank 102. Water, soap mix, bubbles, etc., that rise above the second level 404 will flow from the tank 102 via the overflow lip 106. Thus, the fluid level in the tank will never reach the first level 402 or the top 400 of the tank 102 as the fluid will always drain via the overflow lip 106.

Pivoting arms 119A and 119B are shown residing on top of the overflow lip 106. As can be appreciated by one skilled in the art and as described above, the flow director (e.g., pivoting arms 119A and 119B) is used to alter the width 400 of the flow that flows over the overflow lip 106. Such width 400 control can be used to manage the thickness (or depth) of the sheet of water that falls from the tank 102.

Figure 5:
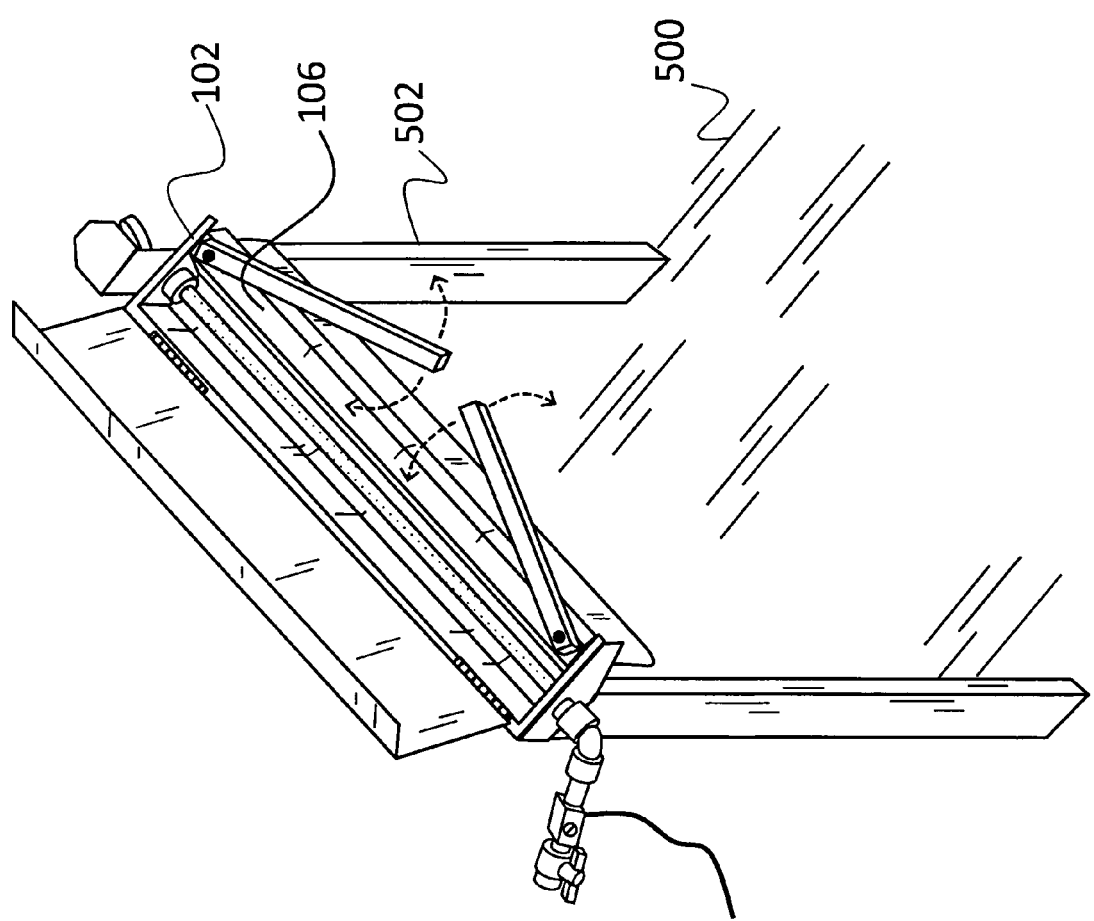
FIG. 5 is an elevated, perspective-view illustration of the waterfall tank system and its support system, depicting a lid of the tank system in an open position.

As shown in FIG. 5, the waterfall tank system 100 is formed such that the tank 102 is elevated (using a support system 502) above a ground surface 500 to allow a vehicle to pass beneath the tank 102. The support system 502 is any suitable mechanism or device for elevating the tank 102. As a non-limiting example, the support system 502 includes a set of posts connected with the tank 102 (to raise the tank 102 above the ground surface 500). The posts are of any suitable height to allow a vehicle to pass below the tank 102, a non-limiting example of which includes being 10 feet tall. As yet another non-limiting example, the support system 502 includes a set of brackets for attaching the tank 102 to a lateral wall surface such that the tank 102 is elevated sufficiently.

Figure 6:
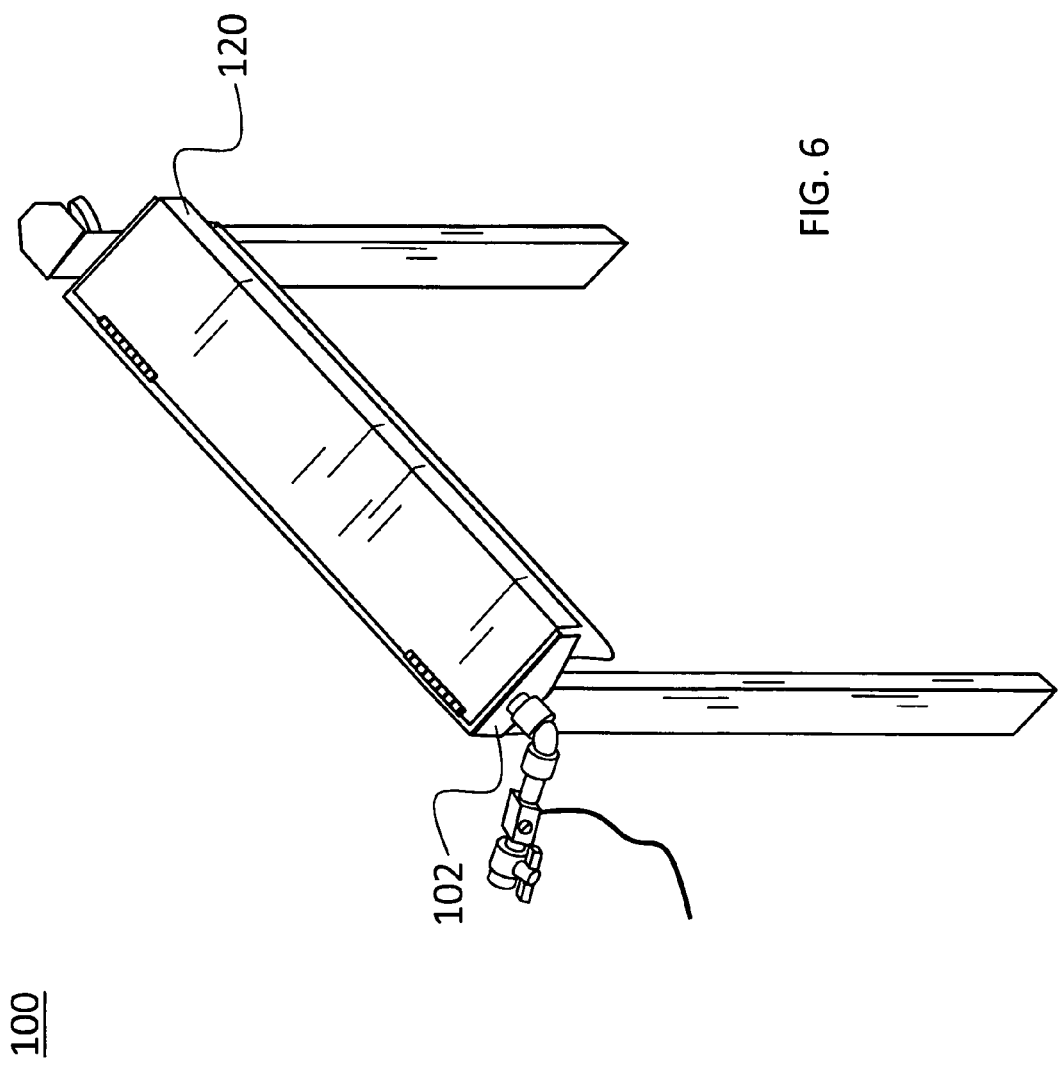
FIG. 6 is an elevated, perspective-view illustration of the waterfall tank system and its support system, depicting a lid of the tank system in a closed position.

FIG. 6 depicts the waterfall tank system 100 with the lid 120 in a closed position to cover the tank 102.

Finally, FIG. 7 depicts the waterfall tank system 100 in operation. As shown, the tank 102 is elevated above the ground surface 500 through the support system 502. The tank 102 is elevated sufficiently to allow a vehicle 700 to pass below the tank 102. Upon introducing water, soap, and air to the tank 102, a soap mix is formed with bubbles 702. After reaching the level of the overflow lip (not shown), the soap mix/water (and bubbles 702) flow over the overflow lip and sheet 704 from the tank 102 onto the passing vehicle 700. The tank 102 and overflow lip themselves are of a sufficient size to have a width 706 that is as least as wide as the passing vehicle 700. As a non-limiting example, the width is greater than 48 inches and less than 144 inches. Thus, using the present invention, a vehicle can safely pass below the tank 102 to receive a relatively even distribution of a large volume of soap, water, and bubbles without the need for multiple, high-pressure spray heads.

What is claimed is:

1. A waterfall tank system for applying fluid onto a passing vehicle, comprising:
    a tank, the tank having a trough portion and an overflow lip;
    a support system connected with the tank for elevating the tank above a ground surface to allow a vehicle to pass beneath the tank;
    a curtain attached with the tank such that it hangs from the tank proximate the overflow lip;
    a water supply inlet fluidly connected with the trough portion of the tank for receiving a water flow from an external water source and introducing water into the tank;
    a soap injector fluidly connected with the water supply inlet for injecting soap into the water flow to create a soap mix that is supplied to the tank;
    a perforated air manifold positioned in the trough portion of the tank; and
    an air motor fluidly connected with the perforated air manifold to introduce air through the perforated air manifold and into the soap mix, whereby upon receiving the soap mix and air, bubbles are created that fill the tank until reaching the overflow lip, at which point the bubbles and soap mix flow over the overflow lip and onto a passing vehicle.

2. The waterfall tank system as set forth in claim 1, further comprising a flow director connected with the overflow lip to direct water flowing over the overflow lip.

3. The waterfall tank system as set forth in claim 2, wherein the flow director includes a first pivoting arm and a second pivoting arm, each of the pivoting arms being pivotally connected with the overflow lip such that they can independently reside on the overflow lip to narrow a width of flow of water flowing over the overflow lip or pivot way from the overflow lip to increase the width of flow of water flowing over the overflow lip.

4. The waterfall tank system as set forth in claim 3, further comprising a mechanical float valve operably connected with the water supply inlet to close upon the soap mix exceeding a predetermined level within the tank and to open upon the soap mix falling below the predetermined level.

5. The waterfall tank system as set forth in claim 4, wherein the perforated air manifold is a pipe manifold with a top half and a bottom half, with two rows of holes formed along the top half and a single row of holes formed along the bottom half.

6. The waterfall tank system as set forth in claim 5, wherein the overflow lip has a width that is at least as wide as a passing vehicle.

7. The waterfall tank system as set forth in claim 1, wherein the perforated air manifold is a pipe manifold with a top half and a bottom half, with two rows of holes formed along the top half and a single row of holes formed along the bottom half.

8. A waterfall tank system for applying water onto a passing vehicle, comprising:
   a tank, the tank having a trough portion and an overflow lip;
   a support system connected with the tank for elevating the tank above a ground surface to allow a vehicle to pass beneath the tank; and
   a water supply inlet fluidly connected with the trough portion of the tank for receiving a water flow from an external water source and introducing water into the tank, whereby upon receiving water, the trough portion collects the water until the water reaches the overflow lip, at which point the water flows over the overflow lip and falls from the tank onto a passing vehicle;
   a flow director connected with the overflow lip to direct water flowing over the overflow lip; and
   wherein the flow director includes a first pivoting arm and a second pivoting arm, each of the pivoting arms being pivotally connected with the overflow lip such that they can independently reside on the overflow lip to narrow a width of flow of water flowing over the overflow lip or pivot way from the overflow lip to increase the width of flow of water flowing over the overflow lip.

9. A tank system for applying fluid onto a passing vehicle, comprising:
   a tank, the tank having a trough portion and an overflow lip;
   a support system connected with the tank for elevating the tank above a ground surface to allow a vehicle to pass beneath the tank;
   a curtain attached with the tank such that it bangs from the tank proximate the overflow lip;
   a soap mix system fluidly connected with the tank for introducing a soap mix to the tank;
   an air manifold positioned in the trough portion of the tank; and
   an air motor fluidly connected with the air manifold to introduce air through the air manifold and into the soap mix, whereby upon receiving the soap mix and air, bubbles are created that fill the tank until reaching the overflow lip, at which point the bubbles and soap mix flow over the overflow lip and onto a passing vehicle.

* * * * *